Oct. 6, 1936.　　　C. L. KENNEDY　　　2,056,676

MOTOR AND MOUNTING THEREFOR

Filed Nov. 21, 1935　　　2 Sheets-Sheet 1

Witness
Paul F. Bryant

Inventor
Carlton L. Kennedy
by his attorneys
Fish Hildreth Cary & Jenney

Oct. 6, 1936.  C. L. KENNEDY  2,056,676
MOTOR AND MOUNTING THEREFOR
Filed Nov. 21, 1935   2 Sheets-Sheet 2
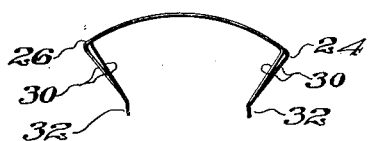
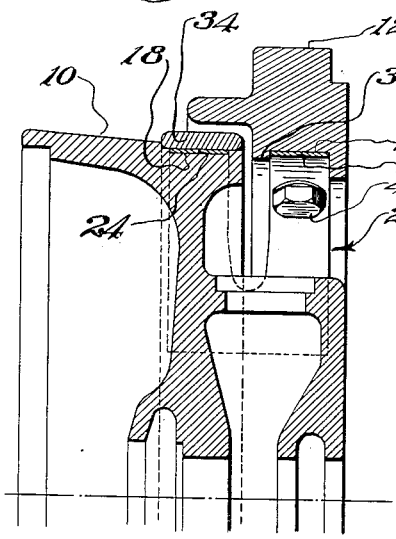
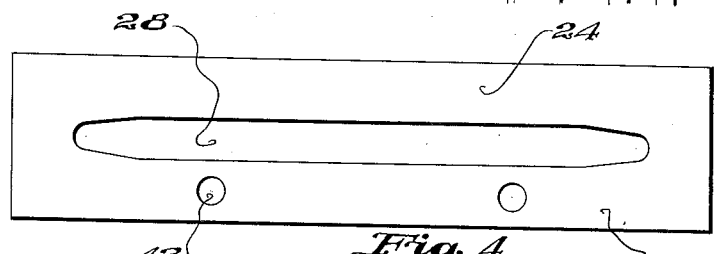
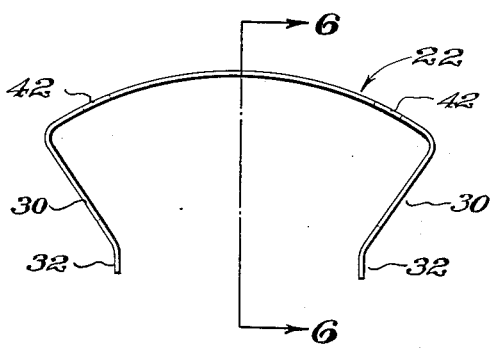
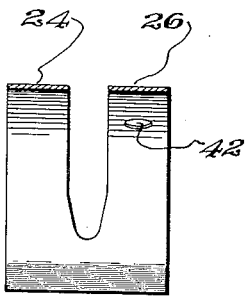

Patented Oct. 6, 1936

2,056,676

UNITED STATES PATENT OFFICE 2,056,676

MOTOR AND MOUNTING THEREFOR

Carlton L. Kennedy, Braintree, Mass., assignor to The Holtzer-Cabot Electric Company, Roxbury, Mass., a corporation of Massachusetts Application November 21, 1935, Serial No. 50,924

11 Claims. (Cl. 248—26)

The present invention relates to motors and mountings therefor, and more particularly to mountings of the general type disclosed in my prior Patent No. 1,798,846, granted March 31, 1931.

The construction disclosed in my patent comprises resilient supports which are particularly useful for motors having a variable torque, such as single phase induction motors. The supports are placed at opposite ends of the motor and form trusses to support the motor, while absorbing such vibrations as arise from the variable torque and preventing their transmission to the base.

The principal object of the present invention is to provide suitable supporting means for flange-mounted motors, whereby the pulsations may be effectively absorbed without transmission to the flange mounting. Such motors introduce special difficulties because the motor is supported at one end only and there is a considerable moment acting on any devices which may be used to connect the motor to the flange. It is therefore a further object of the invention to provide a mounting which is not only sufficiently resilient to prevent transmission of pulsations to the flange, but also strong enough to support the motor and to preserve its alignment.

With these and other objects in view, as will hereinafter appear, the present invention comprises the motor and mounting hereinafter described and particularly defined in the claims.

Figure 1:
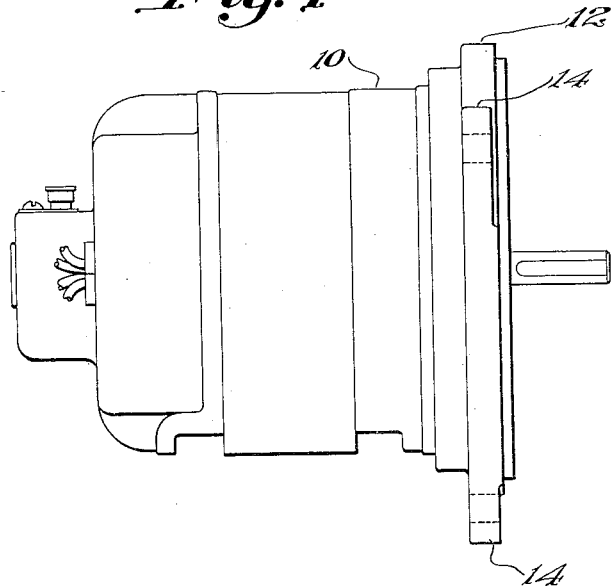
Figure 2:
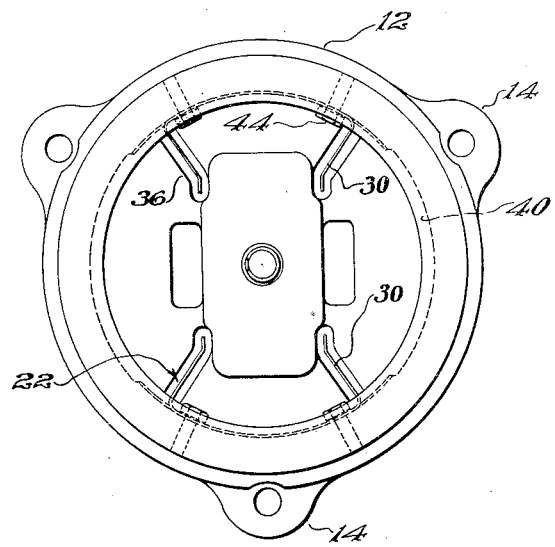

In the accompanying drawings, Fig. 1 is a side elevation of the preferred form of motor and mounting flange; Fig. 2 is an end elevation; Fig. 3 is a detail sectional view showing the mode of attachment of the motor to the mounting flange; Fig. 4 is a development of the mounting spring; Fig. 5 is an elevation of the shaped mounting spring; Fig. 6 is a section on line 6—6 of Fig. 5, and Fig. 7 is a diagram illustrating the flexure of the supporting spring.

The illustrated embodiment of the invention comprises a motor 10 having a frame of conventional form and a mounting flange 12 having suitable lugs 14 to permit attachment to a bracket. According to the present invention, the motor is mounted on the flange by one or more members having spring portions extending in a substantially radial direction toward the motor axis.

As shown in Fig. 3, the motor frame is provided with an arcuate seat 18 and the mounting flange 12 is provided with an internal arcuate seat 20. A spring mounting member, indicated generally at 22 and of the shape shown in Fig. 5, has two arms 24 and 26, the former being received on the arcuate seat 18 of the motor frame and the latter being received with the seat 20 of the mounting flange. The mounting member, before shaping, is of the form shown in Fig. 4, comprising a plate having an elongated longitudinal slot 28 between the arms 24 and 26. The central part of the plate is curved to conform to the seats 18 and 20 and the end portions 30 are bent inwardly to be directed toward the axis of the motor shaft. The extreme ends of the spring plate are bent outwardly, as indicated at 32, for a purpose to be presently described. The radial portions 30 of the plate form the spring mounting means, while the central portions on opposite sides of the slot serve as means for attachment to the frame and mounting flange.

In assembly, two of the spring members 22 are used, as illustrated in Fig. 2. These are first mounted on the motor frame, the portions 24 engaging the seats 18 of the frame. A clamping ring 34 is then forced tightly on the frame to hold the springs in place. In order that the motor frame need not be increased in length by the springs of the present invention, the end of the motor frame is recessed, as indicated at 36 in Fig. 2, to accommodate the portions 30 and 32 of the mounting springs.

The springs having been attached to the motor frame, the mounting flange is now placed on the spring. As shown in Fig. 3, the mounting flange has an internal lip 38 which lies over the portion 26 of the spring after assembly. The lip, however, does not extend completely around the flange but is cut away over a considerable portion of its periphery, as indicated at 40 in Fig. 2. This permits the flange to be mounted over the portion 26, after which the flange is then rotated into the position shown in Fig. 2. The portion 26 of the spring is provided with bolt holes 42 which register with bolt holes in the flange and the flange is finally secured to the spring by bolts 44.

In operation, the motor, if a single phase induction motor, is subjected to pulsations in torque due to the elliptical magnetic field. As described in my prior patent above referred to, the use of radially extending springs prevents transmission of pulsations to the mounting. The present invention provides a similar action for a flange mounted motor. The portions 30 of the spring on opposite sides of the slot are sufficiently stiff to hold the motor in position against the torque reaction, but are resilient enough to oscillate slightly with respect to each other to absorb the pulsations in torque. Fig. 7 shows in an exaggerated manner the flexure of the spring under the variable torque of the motor. The motor frame is therefore permitted to oscillate slightly with respect to the flange support, thereby preventing the undesirable vibrations from being communicated to the support. The most effective absorption of vibration occurs when the portions 30 are truly radial, but the invention is not to be considered as limited to such disposition of the springs, since satisfactory operation may be obtained even when the portions 30 depart somewhat from the radial.

It will be observed that the whole weight of the motor is supported by the unslotted end portions which are disposed in longitudinal planes including the axis of the motor. Since the supports are at only one end of the motor, they are subjected to a considerable bending moment. It is for this purpose that the extreme end portions of the spring are bent out of the radial line, as indicated at 32. This gives a beam section which resists the tendency of the weight of the motor to crumple the springs.

This invention having been described, what is claimed is:

1. The combination with a variable torque motor and a mounting flange, of a plate having separated portions attached to the motor and flange and an inwardly extended spring end portion lying substantially in a plane which includes the motor axis.

2. The combination with a variable torque motor and a mounting flange, of an arcuate plate having separated portions attached to the motor and flange, and spring end portions extending substantially radially toward the motor axis, the end portions forming the sole support of the motor on the flange.

3. The combination with a variable torque motor and a mounting flange, of a plate having a longitudinal slot, means for attaching the motor and flange to the plate on opposite sides of the slot, the plate having end portions extending substantially radially toward the motor axis.

4. The combination with a variable torque motor and a mounting flange, of a plate having an arcuate middle portion and substantially radially extending end portions, the plate being slotted in both the arcuate and end portions, and means for independently attaching the motor and flange to the arcuate portions.

5. The combination with a variable torque motor and a mounting flange, of a plate having separated portions attached to the motor and flange, and inwardly directed substantially radial portions, the radial portions being slotted except at the ends.

6. The combination with a variable torque motor and a mounting flange, of a plate having separated portions attached to the motor and flange, and inwardly directed substantially radial portions, the radial portions being slotted except at the ends, the extreme ends of the radial portions being bent to afford support for the motor.

7. A support for a flange mounted motor comprising a plate having an arcuate middle portion and radially directed end portions, the plate having a longitudinal slot in the middle portion and a part of each end portion.

8. A support for a flange mounted motor comprising a plate having an arcuate middle portion and radially directed end portions, the plate having a longitudinal slot in the middle portion and a part of each end portion, the extreme ends of the plate being bent from the radial.

9. The combination with a variable torque motor and a mounting flange, of a plate having a longitudinal slot, the plate being formed with an arcuate middle portion and substantially radially extending end portions, means for attaching the arcuate portion on one side of the slot to the motor, the flange having an internal seat for the arcuate portion on the other side of the slot, a lip on the inner side of the flange and extending only part way around the flange whereby the flange may be placed on the plate and rotated into a position in which the plate is retained by the lip, and means for securing the flange and the plate together.

10. The combination with a variable torque motor and a mounting flange, of a plurality of spring plate members lying substantially in planes which include the motor axis, each member being provided with an inwardly extending slot, and means for securing each member to the motor at one side of the slot and to the flange at the other side of the slot.

11. The combination with a variable torque motor and a mounting flange, of a plurality of plates each having an attaching portion for connection to the motor and flange and an end portion directed inwardly substantially toward the motor axis, each plate having a slot extending throughout the attaching portion and a part of the end portion.

CARLTON L. KENNEDY.